United States Patent
Wong et al.

(10) Patent No.: US 12,281,796 B1
(45) Date of Patent: Apr. 22, 2025

(54) COMBUSTION SYSTEM WITH DUAL FUEL CAPABILITY

(71) Applicant: PRATT & WHITNEY CANADA CORP., Longueuil (CA)

(72) Inventors: Owen Wong, Markham (CA); Jayaprakash Kannan, North York (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/608,525

(22) Filed: Mar. 18, 2024

(51) Int. Cl.
*F23R 3/36* (2006.01)
*F02C 7/22* (2006.01)
*F02C 7/232* (2006.01)
*F23R 3/28* (2006.01)

(52) U.S. Cl.
CPC ............ *F23R 3/36* (2013.01); *F02C 7/22* (2013.01); *F02C 7/232* (2013.01); *F23R 3/286* (2013.01)

(58) Field of Classification Search
CPC .... F23R 3/28; F23R 3/286; F23R 3/36; F02C 7/22; F02C 7/222
See application file for complete search history.

(56) References Cited

U.S. PATENT DOCUMENTS

| | | | |
|---|---|---|---|
| 4,833,878 A * | 5/1989 | Sood | F02C 9/40 60/39.463 |
| 5,361,578 A * | 11/1994 | Donlan | F23L 7/005 60/742 |
| 6,427,930 B1 * | 8/2002 | Mei | F23R 3/60 239/419 |
| 6,755,024 B1 * | 6/2004 | Mao | F23D 11/107 239/416 |
| 10,570,861 B2 | 2/2020 | Schwarte et al. | |
| 10,598,102 B2 | 3/2020 | Boog et al. | |
| 11,649,774 B2 | 5/2023 | Wloka | |
| 11,788,727 B2 | 10/2023 | Chabaille et al. | |
| 2007/0277528 A1 * | 12/2007 | Homitz | F23D 14/08 60/737 |
| 2014/0090394 A1 * | 4/2014 | Low | F23R 3/28 60/776 |
| 2015/0253009 A1 * | 9/2015 | Bandaru | F23R 3/28 60/740 |
| 2015/0253010 A1 * | 9/2015 | Schlein | F23D 17/002 60/776 |
| 2016/0076461 A1 * | 3/2016 | Kawai | B64D 37/30 60/39.463 |
| 2016/0116168 A1 * | 4/2016 | Bandaru | F23R 3/28 60/39.48 |
| 2016/0209037 A1 * | 7/2016 | Dai | F23R 3/12 |
| 2016/0209038 A1 * | 7/2016 | Kopp-Vaughan | F23R 3/28 |
| 2017/0122212 A1 * | 5/2017 | Cadman | F02C 7/222 |
| 2019/0257520 A1 * | 8/2019 | Tibbs | F23R 3/14 |

(Continued)

*Primary Examiner* — William H Rodriguez
(74) *Attorney, Agent, or Firm* — Kinney & Lange, P. A.

(57) ABSTRACT

A fuel injector includes a first fuel path, a second fuel path, and an air path. The first fuel path is independent from the second fuel path. The ratio of a first outlet area of the first fuel path, a second outlet area of the second fuel path, and a third outlet area of the air path is constant. A fuel system includes a first fuel source, a second fuel source, an air source, and the injection. The first fuel source is fluidly connected to the first fuel path. The second fuel source is fluidly connected to the second fuel path. The air source is fluidly connected to the air path.

16 Claims, 9 Drawing Sheets

(56) References Cited

U.S. PATENT DOCUMENTS

| | | | |
|---|---|---|---|
| 2020/0003421 A1* | 1/2020 | Sanchez | F23D 11/107 |
| 2022/0268213 A1* | 8/2022 | Morenko | F23R 3/12 |
| 2022/0356845 A1* | 11/2022 | Morenko | F23D 11/107 |
| 2024/0044496 A1 | 2/2024 | Snyder | |

* cited by examiner

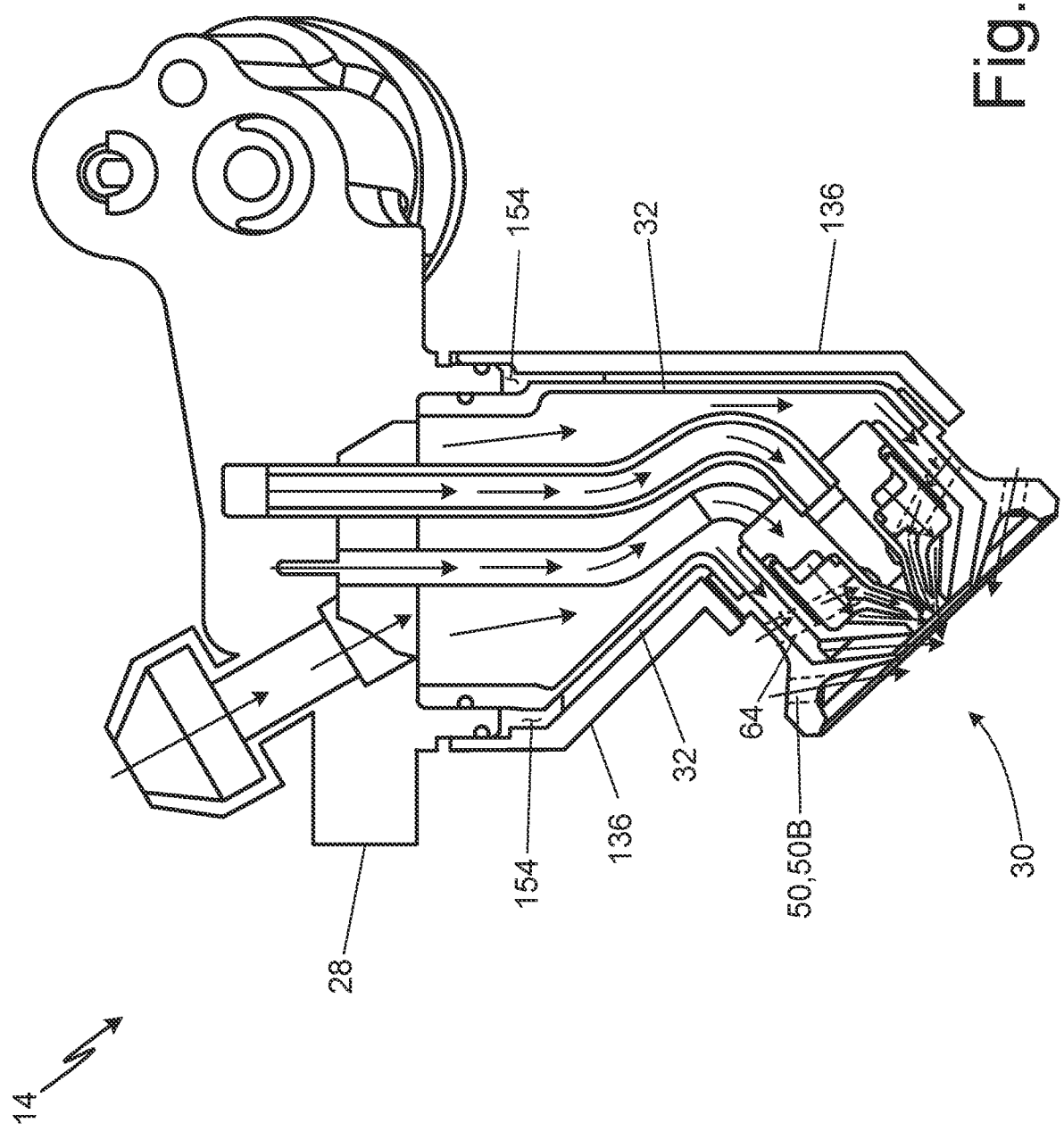

COMBUSTION SYSTEM WITH DUAL FUEL CAPABILITY

BACKGROUND

The present disclosure relates generally to combustors of gas turbine engines, and more particularly, multi-fuel injectors for gas turbine engine combustion.

Fuel injectors and air-fuel mixers of gas turbine engines are designed to use a single fuel source. Aircraft engines, for example, have injectors designed for Jet-A, Jet-SAF, or another viable fuel source. Multi-fuel configurations require multiple sets of injectors, each injector set optimized for a specific fuel and air supply, which increases complexity, risk of failure, and cost of the gas turbine engine fuel system. Since gas turbine engines that utilize multiple fuel sources, and more particularly aircraft engines, can be adapted for a wider array of operating conditions and missions, further development of multi-fuel systems and components thereof is desirable.

SUMMARY

A fuel injector according to an example of this disclosure includes a first fuel path, a second fuel path, and an air path. The second fuel path is independent from the first fuel path. The ratio of a first outlet area of the first fuel path, a second outlet area of the second fuel path, and a third outlet area of the air path is constant.

A fuel injector according to another example of this disclosure includes a head body, a nozzle, a fuel body, and a first fuel tube. The head body includes a first fuel inlet passage and a second fuel inlet passage. The nozzle includes a first fuel outlet passage, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube joins to the head body and extends through the fuel cavity to the nozzle body. The first fuel tube fluidly connects the first fuel inlet passage the first fuel outlet passage to define a first fuel path. The air path of the fuel injector includes the air outlet passage.

A fuel injector according to another example of this disclosure includes a head body, a nozzle, a fuel body, a first fuel tube, and a second fuel tube. The head body includes a plurality of first fuel inlet passages and a second fuel inlet passage. The nozzle includes a plurality of first fuel outlet passages, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube and the second fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The air path of the fuel injector includes the air outlet passage.

A fuel injector according to another example of this disclosure includes a head body, a nozzle, a fuel body, a first fuel tube, a second fuel tube, and an outer body. The head body includes a plurality of first fuel inlet passages and a second fuel inlet passage. The nozzle includes a plurality of first fuel outlet passages, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube and the second fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The outer body joins to the head body and is concentric with the fuel body at the head body. The outer body includes an air inlet passage extending through the outer body and is spaced from the fuel body to form an air cavity. The air inlet passage, the air cavity, and the air outlet passage define an air path.

A fuel injector according to another example of this disclosure includes a head body, a nozzle, a first fuel tube, a second fuel tube, a third fuel tube, and an outer body. The head body includes a plurality of first fuel inlet passages and a second fuel inlet passage. The nozzle includes a plurality of first fuel outlet passages, a second fuel outlet passage, and an air outlet passage. The first fuel tube, the second fuel tube, and the third fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The third fuel tube fluidly connects the second fuel inlet passage to the second fuel outlet passage. The outer body joins to the head body. The outer body includes an air inlet passage extending through the outer body and forms an air cavity. The air inlet passage, the air cavity, and the air outlet passage define an air path.

A fuel injector according to another example of this disclosure includes a head body, a nozzle, a stem, one or more first internal fuel passages, a second internal fuel passage, and an outer body. The head body includes a plurality of first fuel inlet passages and a second fuel inlet passage. The nozzle includes a plurality of first fuel outlet passages, a second fuel outlet passage, and an air outlet passage. The first internal fuel passage and the second internal fuel passage extend through the stem from the head body to the nozzle body. Each of the first internal fuel passages fluidly connects one of the first fuel inlet passages to one of the first fuel outlet passages, each defining a first fuel path. The second internal fuel passage fluidly connects the second fuel inlet passage to the second fuel outlet passage to define a second fuel path. The outer body joins to the head body. The outer body includes an air inlet passage extending through the outer body and forms an air cavity. The air inlet passage, the air cavity, and the air outlet passage define an air path.

A fuel system according to an example of this disclosure includes a first fuel source, a second fuel source, an air source, and a fuel injector. The fuel injector includes a first fuel path, a second fuel path, and an air path. The second fuel path is independent from the first fuel path. The first fuel source fluidly connects to the first fuel path. The second fuel source fluidly connects to the second fuel path. The air source fluidly connects to an air path of the fuel injector.

A fuel system according to another example of this disclosure includes a first fuel source, a second fuel source, an air source, and a fuel injector. The fuel injector includes a head body, a nozzle, a fuel body, and a first fuel tube. The head body includes a first fuel inlet passage and a second fuel inlet passage. The nozzle includes a first fuel outlet passage, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube joins to the head body and extends through the fuel cavity to the nozzle body. The first fuel tube fluidly connects the first fuel inlet passage the first fuel outlet passage to define a first fuel path. The air path of the fuel injector includes the air outlet passage. The first fuel source fluidly connects to the first fuel path. The second fuel source fluidly connects to the second fuel path. The air source fluidly connects to an air path of the fuel injector.

A fuel system according to another example of this disclosure includes a first fuel source, a second fuel source, an air source, and a fuel injector. The fuel injector includes a head body, a nozzle, a fuel body, a first fuel tube, and a second fuel tube. The head body includes a plurality of first fuel inlet passages and a second fuel inlet passage. The nozzle includes a plurality of first fuel outlet passages, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube and the second fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The air path of the fuel injector includes the air outlet passage. The first fuel source fluidly connects to the first fuel path. The second fuel source fluidly connects to the second fuel path. The air source fluidly connects to an air path of the fuel injector.

A fuel system according to another example of this disclosure includes a first fuel source, a second fuel source, an air source, and a fuel injector. The fuel injector includes a head body, a nozzle, a fuel body, a first fuel tube, a second fuel tube, and an outer body. The head body includes a plurality of first fuel inlet passages and a second fuel inlet passage. The nozzle includes a plurality of first fuel outlet passages, a second fuel outlet passage, and an air outlet passage. The fuel body joins the head body to the nozzle body and bounds a fuel cavity that fluidly connects the second fuel inlet passage to the second fuel outlet passage to define a second fuel path. The first fuel tube and the second fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The outer body joins to the head body and is concentric with the fuel body at the head body. The outer body includes an air inlet passage extending through the outer body and is spaced from the fuel body to form an air cavity. The air inlet passage, the air cavity, and the air outlet passage define an air path. The first fuel source fluidly connects to the first fuel path. The second fuel source fluidly connects to the second fuel path. The air source fluidly connects to an air path of the fuel injector.

A fuel system according to another example of this disclosure includes a first fuel source, a second fuel source, an air source, and a fuel injector. The fuel injector includes a head body, a nozzle, a first fuel tube, a second fuel tube, a third fuel tube, and an outer body. The head body includes a plurality of first fuel inlet passages and a second fuel inlet passage. The nozzle includes a plurality of first fuel outlet passages, a second fuel outlet passage, and an air outlet passage. The first fuel tube, the second fuel tube, and the third fuel tube join to the head body and extend through the fuel cavity to the nozzle body. The first fuel tube fluidly connects one of the first fuel inlet passages to one of the first fuel outlet passages, and the second fuel tube fluidly connects another of the first fuel inlet passage to another first fuel outlet passage, each defining a first fuel path for providing a primary fuel portion and a secondary fuel portion. The third fuel tube fluidly connects the second fuel inlet passage to the second fuel outlet passage. The outer body joins to the head body. The outer body includes an air inlet passage extending through the outer body and forms an air cavity. The air inlet passage, the air cavity, and the air outlet passage define an air path.

A fuel system according to another example of this disclosure includes a first fuel source, a second fuel source, an air source, and a fuel injector. The fuel injector includes a head body, a nozzle, a stem, one or more first internal fuel passages, a second internal fuel passage, and an outer body. The head body includes a plurality of first fuel inlet passages and a second fuel inlet passage. The nozzle includes a plurality of first fuel outlet passages, a second fuel outlet passage, and an air outlet passage. The first internal fuel passage and the second internal fuel passage extend through the stem from the head body to the nozzle body. Each of the first internal fuel passages fluidly connects one of the first fuel inlet passages to one of the first fuel outlet passages, each defining a first fuel path. The second internal fuel passage fluidly connects the second fuel inlet passage to the second fuel outlet passage to define a second fuel path. The outer body joins to the head body. The outer body includes an air inlet passage extending through the outer body and forms an air cavity. The air inlet passage, the air cavity, and the air outlet passage define an air path.

BRIEF DESCRIPTION OF THE DRAWINGS

FIG. 8 is a cross-sectional view of another example fuel injector capable of receiving fuel from multiple fuel sources that includes thermal shielding.

DETAILED DESCRIPTION

Figure 1:
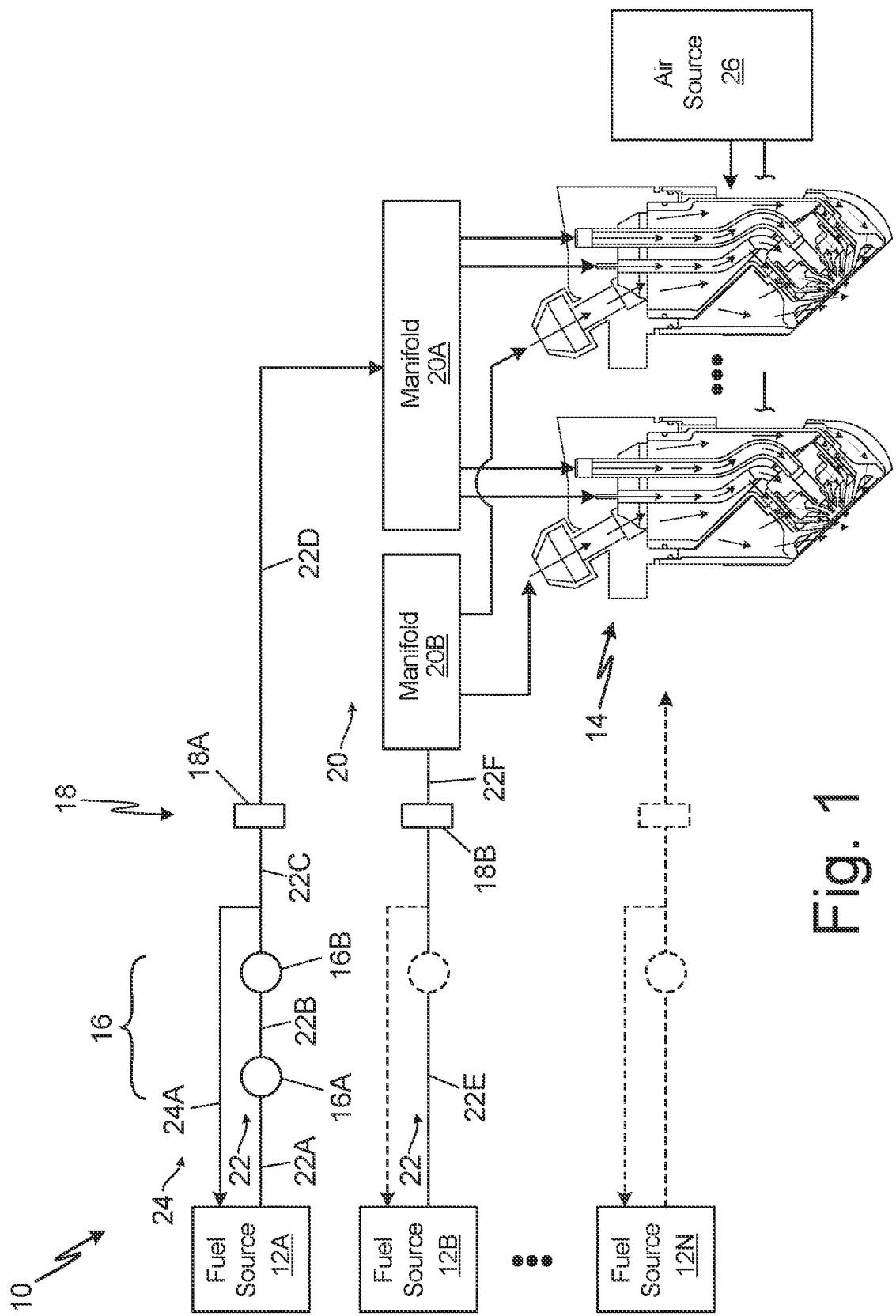
FIG. 1 is a schematic view of an example fuel system that includes multiple fuel sources.

FIG. 1 is a schematic view of fuel system 10, an example fuel system equipped with multiple fuel sources. Fuel system 10 includes fuel sources 12A-12N, fuel injectors 14, one or more pumps 16, metering valves 18, manifolds 20, supply lines 22, one or more return lines 24, and air source 26. Fuel system can include, where appropriate, additional components not shown such as one or more shutoff valves, isolation valves, check valves, filters, heaters, one or more relief valves, and one or more control valves, among other possible components.

Fuel sources 12A-12N include at least two fuel sources (e.g., fuel sources 12A and 12B), or up to an arbitrary number of fuel sources 12N in which "N" represents an arbitrary number of fuel sources 12N. Fuel sources 12A-12N can be a fuel tank or other storage container configured to store liquid fuels, gaseous fuels, and/or fuels that have partial liquid and partial gaseous states within the storage container. While fuel sources 12A-12N are depicted as discrete sources for different fuels, each fuel source 12A-12N can be representative of a distributed fuel source (e.g., multiple fuel tanks and/or other storage containers for a fuel source that is located at various locations within an aircraft's wings, fuselage, tail section, etc.).

Fuel system 10 includes fuel injectors 14 arranged in a circumferentially-spaced array and/or axially-spaced array. Fuel injectors 14 include at least two fuel inlet passages configured to receive and discharge fuel from different fuel sources (e.g., fuel sources 12A and 12B) and air from common air source 26 (e.g., compressor air, combustor air, or other viable air source). Accordingly, each fuel injector 14 receives and discharges fuel from multiple fuel sources (e.g., fuel sources 12A and 12B) simultaneously, from fuel source 12A only, from fuel source 12B only, or from other fuel sources only or from any combination of two or more other fuel sources. In some examples, fuel system 10 may combine fuel injectors 14, which are capable of dispensing multiple fuels, with one or more single-fuel injectors and/or air-fuel mixers.

Pumps 16 can be any electrically-driven or mechanically-driven pump suitable for pressurizing fuels stored within respective fuel sources 12A-12N. Example pumps 16 can include variable displacement pumps (e.g., centrifugal pump) and/or fixed-displacement pumps (e.g., gear pumps). Metering valves 18 can include any variable area valve suitable for use with fuels stored within respective fuel sources 12A-12N such as a solenoid valve, among other possible valve types. Manifolds 20 are any plenum, cavity, or piping arrangement that distributes fuel from one of fuel sources 12A-12N to each of fuel injectors 14, or a subset of fuel injectors 14. Supply lines 22 and return lines 24 can be formed by one or more pipes, conduits, tubes, internal component passages, or any combination thereof, among other possible components, that fluidly connect components of fuel system 10.

Some examples of fuel system 10 include a liquid fuel source (e.g., fuel source 12A) and a gaseous fuel source (e.g., fuel source 12B). For example, the liquid fuel source may store aircraft fuel (e.g., jet-A, jet-SAF, among other viable liquid fuels) and the gaseous fuel source may store hydrogen gas, or another gaseous fuel suitable for aircraft gas turbine engines. Accordingly, both liquid fuel and gaseous fuel can be supplied to fuel injectors 14, which are dispensed into a combustor with air received from air source 26. In other examples, fuel system 10 can include multiple, different liquid fuel sources or multiple, different gaseous fuel sources.

An example liquid fuel supply can include fuel source 12A, boost pump 16A, high-pressure pump 16B, and metering valve 18A, manifold 20A, supply lines 22A, 22B, 22C, and 22D, and return line 24A. Fuel source 12A is a fuel tank or other storage container configured to store aircraft fuel. Supply line 22A fluidly connects fuel source 12A to boost pump 16A, which can be an electrically-driven or a mechanical-driven (e.g., engine-driven) pump that increases liquid fuel pressure to a first stage pressure at a first stage flow rate. Supply line 22B fluidly connects boost pump 16A to high-pressure pump 16B, which may be an electrically-driven or a mechanical-driven (e.g., engine-driven) fixed displacement pump configured to discharge liquid fuel at a second stage pressure and a second stage flow rate. Supply line 22C fluidly connects high-pressure pump 16B to metering valve 18A, which can be a solenoid control valve or other control valve type suitable for varying an outlet area and, hence, a liquid fuel rate to manifold 20A. Manifold 20A distributes fuel to first fuel inlet passages of respective fuel injectors 14. Excess liquid fuel returns to fuel source 12A via return line 24A, which extends from a location downstream of high-pressure pump 16B and upstream from metering valve 18A to fuel source 12A.

An example gaseous fuel supply can include fuel source 12B, metering valve 18B, manifold 20B, and supply lines 22E, and 22F. Fuel source 12B can be a pressurized storage for a gaseous fuel (e.g., hydrogen gas). Supply line 22E fluidly connects fuel source 12B to metering valve 18B, which can be a solenoid control valve or other valve type suitable for varying an outlet area and, hence, a gaseous fuel flow rate to manifold 20B via supply line 22F. Manifold 20B distributes gaseous fuel to second fuel inlet passages of respective fuel injectors 14. To maintain supply pressure of gaseous fuel, gaseous fuel supply can include an accumulator disposed along supply line 22E or incorporated into fuel source 12B. In another example of gaseous fuel supply, a pump or pressure regulator disposed along supply line 22E and a return line connecting the discharge end of the pump to fuel source 12B can be used to maintain a target supply pressure of gaseous fuel. In each configuration, relief valves and respective relief lines and/or return lines can be used to protect fuel system 10 against over pressurization.

While the foregoing description of fuel system 10 includes a liquid fuel supply and a gaseous fuel supply, each fuel supply with a described configuration of components, fuel system 10 can include other configurations for supplying fuel from one of fuel sources 12A-12N to fuel injector 14 without detracting from this disclosure. For example, fuel supplies that connect one of fuel sources 12A-12N to fuel injector 14 can include additional or fewer pumps, or no pumps than the configurations shown in FIG. 1. Similarly, metering valves 18 can be different valve types than the valves described, or may be located at different locations within each fuel supply. More or less fuel supply lines and/or fuel return lines may be present in certain fuel supply configurations, of fuel supply lines and/or fuel return lines may fluidly connect at different locations within fuel system 10 than the locations shown by FIG. 1. Moreover, certain fuel supplies may include additional pumps, valves, supply lines, return lines, and/or manifolds than those described, which are represented by dashed line.

Figure 2:
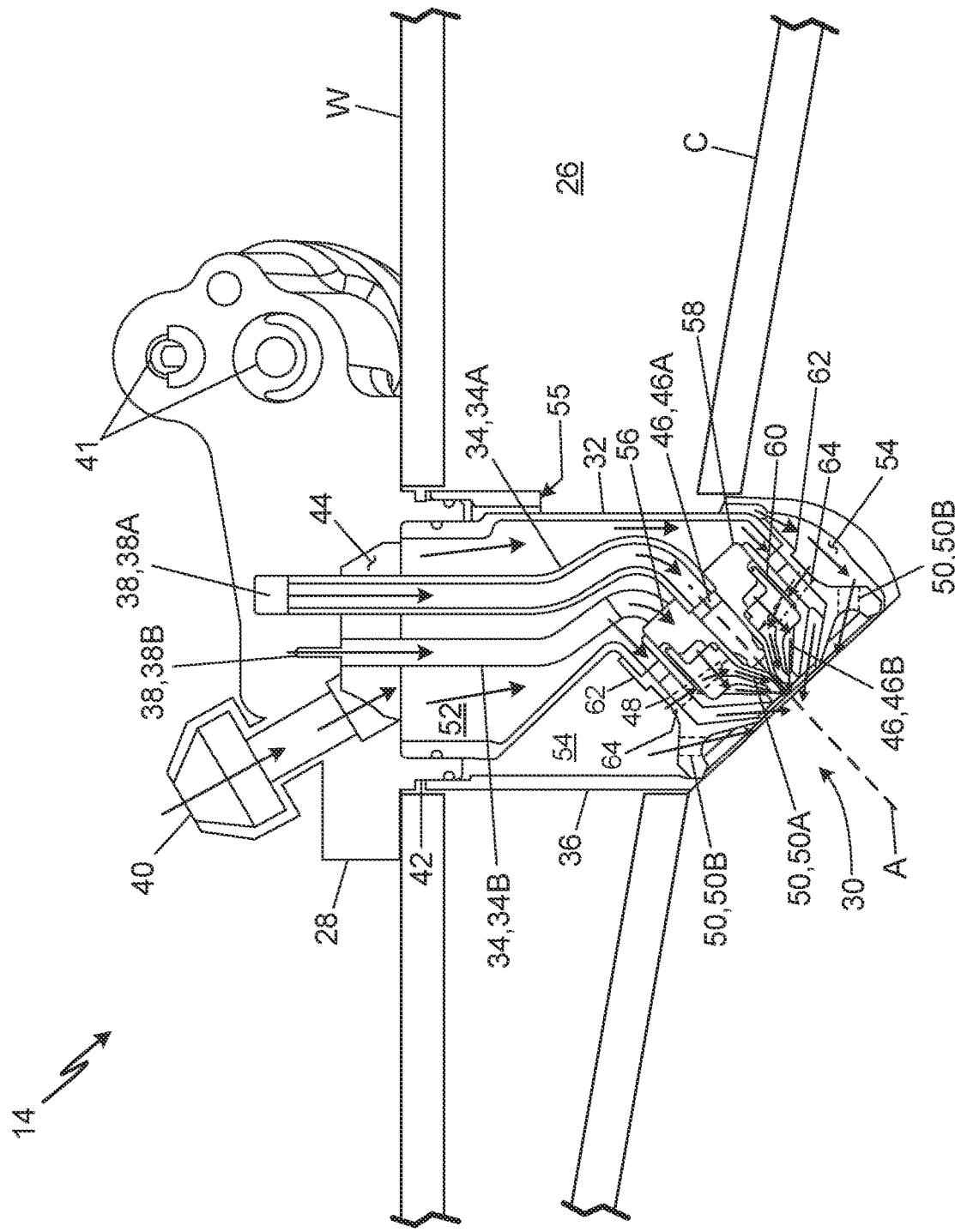
FIG. 2 is a cross-sectional view of an example fuel injector capable of receiving fuel from multiple fuel sources.

FIG. 2 is a cross-sectional view of fuel injector 14, an example fuel injector that includes features for dispensing fuel from multiple fuel sources and providing target air-fuel ratios with a common air supply. Fuel injector 14, as described below, includes a first fuel path, a second fuel path, and an air path. However, in other examples of fuel injector 14, additional fuel paths can be present. As depicted by FIG. 2 fuel injector 14 includes head body 28, nozzle 30, fuel body 32, one or more fuel tubes 34, and in some examples, outer body 36.

Head body 28 is a monolithic body that forms an inlet end of fuel injector 14. Head body 28 includes at least one first fuel inlet passage 38 and at least one second fuel inlet passage 40 each extending entirely through head body 28. First fuel inlet passages 38 can include one or more distribution passages 41 which extend transversely to fuel inlet passages 38 in the depicted example. In some examples, head body 28 includes a single first fuel inlet passage 38 for providing fuel from a first source (e.g., fuel source 12A) and a single second fuel inlet passage 40 for providing fuel from a second fuel source (e.g., fuel source 12B). In other examples, such as the example depicted by FIG. 2, head body 28 can include multiple first fuel inlet passages 38, for example first fuel inlet passages 38A and 38B, for providing a first portion of fuel from the first fuel source (i.e., primary fuel) through first fuel inlet passage 38A and providing a second portion of fuel from the first fuel source (i.e., secondary fuel) through first fuel inlet passage 38B. In still other examples, head body 28 can include additional first fuel inlet passages 38 and/or additional second fuel inlet passages 40. In each instance, first fuel inlet passages 38 are independent of second fuel inlet passages 40 such that fuel from the first fuel source (e.g., fuel source 12A) does not interact or mix with fuel received from the second fuel source (e.g., fuel source 12B) until dispensed from nozzle 30.

In some examples, head body 28 includes rim 42 extending from the interior surface of head body towards nozzle 30. As depicted, rim 42 is cylindrical protrusion bound by an interior surface, an exterior surface, and an end surface. The interior surface and exterior surface of rim 42 form inner and outer peripheral surfaces of rim 42, respectively, while end surface joins interior surface to exterior surface at a distal end of rim 42. The interior surface of rim 42 can have a size and shape configured to receive fuel body 32 and the exterior surface of rim 42 can have a size and shape configured to receive outer body 36. For example, each of the interior and exterior surfaces of rim 42 can be cylindrical with diameters conforming to an outer surface of fuel body 32 and an interior surface of outer body 36 respectively. Other complimentary shapes of rim 42, fuel body 32, and outer body 36 are possible in different examples of fuel injector 14.

In certain examples, head body 28 can include pocket 44. Pocket 44 is a void, recess, or cavity protruding from the interior surface into head body 28 (i.e., a surface of head body 28 joined to or mated with fuel body 32). Pocket 44 can be configured to intersect at least one second fuel inlet passage 40 of head body 28 such that fuel delivered to second inlet fuel passage 38 is received within pocket 44, which also flows through fuel body 32.

Nozzle 30 is a monolithic body or an assembly of components that are brazed, welded or otherwise mechanically joined to form an outlet end of fuel injector 14. Nozzle 30 includes at least one first fuel outlet passage 46, at least one second fuel outlet passage 48, and at least one air outlet passage 50. First fuel outlet passage 46, second fuel outlet passage 48, and/or air outlet passage 50 can be formed by an annular gap between concentric components of nozzle 30 and/or by one or more passages extending through one or more components of nozzle 30. For instance, first fuel outlet passage 46, second fuel outlet passage 48, and/or air outlet passage 50 can include an array or a pattern of apertures (i.e., outlets) extending through one or more components of nozzle 30 that are spaced circumferentially about a centrally disposed axis of nozzle 30.

Fuel body 32 is a tubular body that extends between and joins head body 28 to nozzle 30. Fuel body 32 is a hollow body that forms fuel cavity 52, which fluidly communicates with the one or more second fuel inlet passages 40 and the one or more second fuel outlet passages 48 of nozzle 30. At an inlet side adjacent to head body 28, walls of fuel body 32 circumscribe one or more first fuel inlet passages 38 and one or more second fuel inlet passages 40. In some examples, walls of fuel body 32 additional circumscribe pocket 44, which is open to fuel cavity 52. Fuel body 32 can be received by the interior surface of rim 42 in some examples. Walls of fuel body 32 may include a cylindrical section adjacent head body 28 that transitions to a tapered section. In certain examples, such as the example depicted by FIG. 2, the tapered section of fuel body 32 can define a monotonically decreasing cross-sectional area of fuel cavity 52 from the cylindrical section of fuel body 32 to nozzle 30 where fuel cavity 66 communicates with one or more second fuel outlet passages 48.

One or more fuel tubes 34 extend from head body 28 to nozzle 30 to fluidly connect one or more first fuel inlet passages 38 to respective first fuel outlet passages 46 of nozzle 30. Each fuel tube 34 extends through fuel cavity 52 such that walls of fuel body 32 surround each fuel tube 34 between head body 28 and nozzle 30. At an outlet end of injector 14, one or more fuel tubes 34 join to nozzle 30 to fluidly connect one or more first fuel inlet passages 38 to respective first fuel outlet passages 46. As depicted in FIG. 2A, fuel injector 14 includes two fuel tubes 34 (e.g., fuel tube 34A and 34B) that fluidly connect respective first fuel inlet passages 38A and 36B to first fuel outlet passages 46A and 46B. In other examples, fuel injector 14 can include more than two fuel tubes 34, or a single fuel tube 34, each connecting one of first fuel inlet passages 38 to a respective first fuel outlet passages 46.

Outer body 36 is a hollow body or a tubular body that extends from head body 28 to nozzle 30 such that walls of outer body 36 surround fuel body 32. Outer body 36 is spaced from fuel body 32 to define air cavity 54 disposed between fuel body 32 and outer body 36 and, in some examples, between nozzle 30 and outer body 36. As depicted in FIG. 2, outer body 36 engages the exterior surface of rim 42 and extends from head body 28 to nozzle 30. The example of outer body 36 depicted by FIG. 2 includes a straight cylindrical section that extends towards nozzle 30 where a curved section of outer body 36 conforms to nozzle 30. Further as depicted, outer body 36 can include air inlet passage 55 that extends through the cylindrical section of outer body 36 to fluidly connect an exterior region (e.g., air source 26) to air cavity 54. In other examples, air inlet passage 55 may represent a plurality of air inlet passages 56 that are distributed about the exterior periphery of outer body 36. In still other examples, such as the outer body example depicted by FIG. 4, outer body 36 does not include air inlet passage 55.

Fuel injector 14 is installed through an engine casing and/or wall of combustor of a gas turbine engine to discharge air and fuel into the combustor. As shown, outer casing wall "W" engages a flange formed by head body 28, fixing fuel injector 14 to the gas turbine engine. The discharge end of fuel injector 14 protrudes through combustor wall "C" into the combustor region. Interposed between outer casing wall "W" and combustor wall "C", fuel injector 14 receives air through air inlet passage 55 from air source 26.

Interconnected components of fuel injector 14 can be mechanically joined utilizing a brazing process and/or a welding process, or a combination of processes. In certain examples, components of fuel injector 14 can include additional features to facilitate assembly of fuel injector 14 such as grooves, channels, chamfers, recesses, and/or intercomponent fits, among other possible features. In the example, mutually engaging surfaces of head body 28, nozzle 30, fuel body 32, outer body 36, and fuel tubes 34 are mechanically joined to form fluid tight boundaries between respective components of fuel injector 14.

In any of the foregoing examples, components of fuel injectors 14 join to define one or more first fuel paths, one or more second fuel paths, and one or more air paths. In operation, fuel delivered to one or more first inlet passages 36 flows, in flow series, through fuel tubes 34 and one or more first outlet passages 44 before discharging from nozzle 30. Fuel delivered to second fuel inlet passage 40 flows, in flow series, through fuel cavity 52 and one or more fuel second fuel outlet passages 48 before discharging from nozzle 30. Air received by air inlet passage 55 flows, in series, through air cavity 54 and air outlet passages 50 before discharging from nozzle 30 and mixing with fuel from one or more sources of fuel. Fuel injector 14 utilizes fuel from multiple sources and discharges each fuel individually or in combination with a common air supply. Accordingly, a ratio among the cumulative outlet area of first fuel outlet passages (i.e., the first fuel path), the cumulative outlet area of second fuel outlet passages (i.e., the second fuel path), and the cumulative outlet area of air outlet passages (i.e., the air path) is constant.

Figure 3:
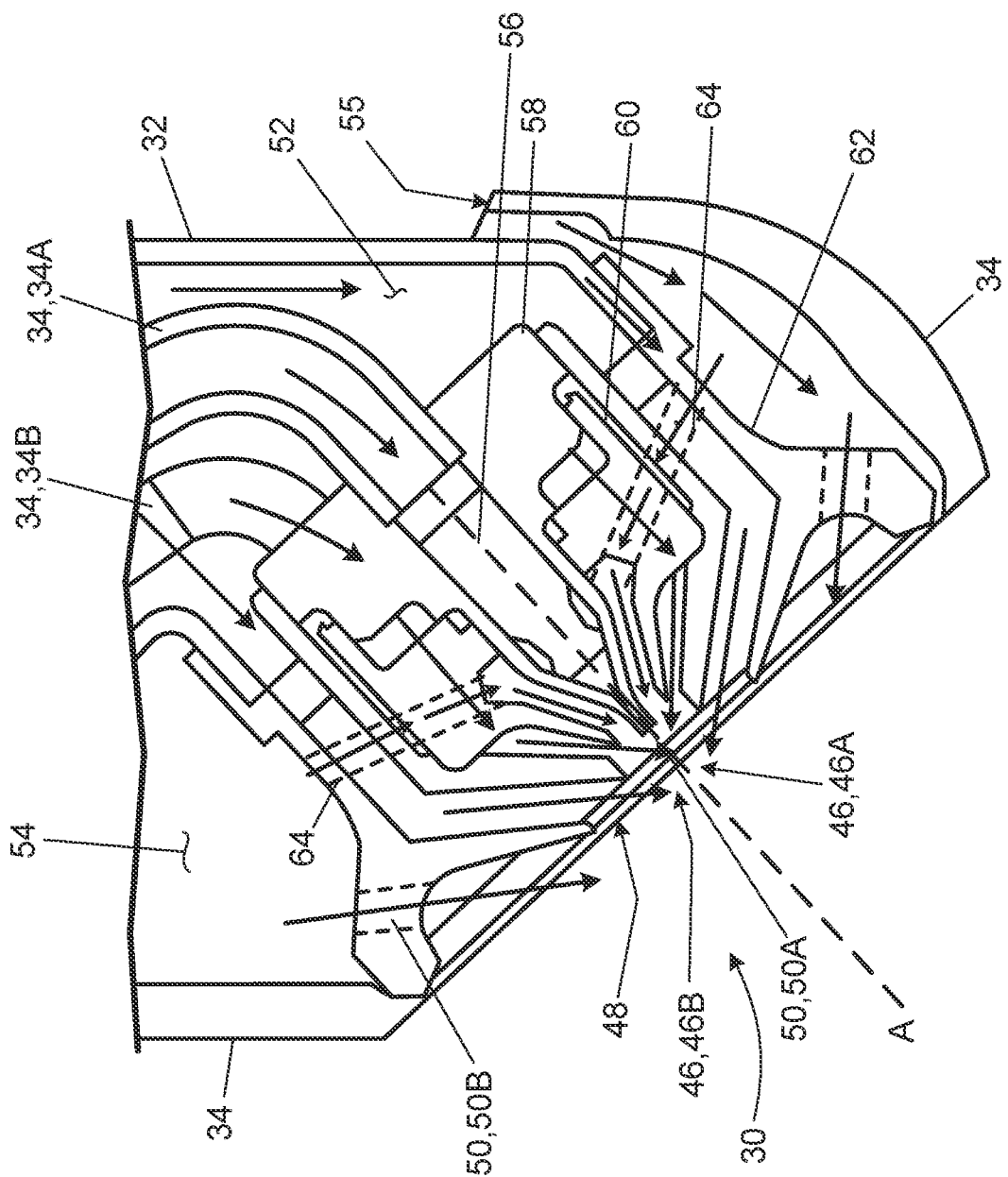
FIG. 3 is an enlarged cross-sectional view of fuel injector discharge end of FIG. 2.

FIG. 3 depicts an enlarged view of nozzle 30 configured to receive primary and secondary fuel from a first fuel source and to receive fuel from a second fuel source. As depicted, nozzle body 28 includes center body 56, inner nozzle body 58 (i.e., a first nozzle body), intermediate nozzle body 60, and air nozzle body 62. However, in other configurations, nozzle 30 can be configured to receive only primary fuel. Accordingly, some configurations of nozzle 30 do not include intermediate nozzle body 60.

Center body 56 is a blunt body and can be cylindrical, conical, rounded, among other possible shapes, or combination of shapes. Inner nozzle body 58 surrounds center body 56 to form one or more first fuel outlet passages 46A for a first portion of fuel from fuel source 12A (i.e., primary fuel). Accordingly, inner nozzle body 58 includes a cylindrical portion that circumscribes center body 56 that extends towards discharge end of fuel injector 14. Axis A is a fictious line that extends through the geometric centerline of center body 56 used to describe additional features of nozzle 30. In some examples, center body 56 and inner nozzle body 58 define a single first fuel outlet passage 46A formed as an annular passage with or without spokes extending between center body 56 and inner nozzle body 58. In other examples, multiple fuel outlet passages 44A are arranged in a circumferential array about axis A and extend through inner nozzle body 58, and/or are formed by mutually engaging portions of center body 56 and inner nozzle body 58. Inner nozzle body 58 further includes a discharge portion formed by a wall section that converges towards axis A.

Intermediate nozzle body 60 includes a cylindrical or annular portion that surrounds inner nozzle body 58 to form one or more additional first fuel outlet passages 46B and/or one or more air outlet passages 50A. First fuel outlet passages 46B can be supplied with a second portion of fuel from fuel source 12A (i.e., secondary fuel). At a discharge end of fuel injector 14, intermediate nozzle body 60 includes a second discharge portion formed by another converging wall section relative to axis A and disposed concentrically with respect to inner nozzle body 58. In some examples, first fuel outlet passages 46B extend through intermediate nozzle body 60 to form a circumferentially spaced array of fuel passages. In certain further examples, air outlet passages 50A are defined by mutually engaging portions of intermediate nozzle body 60 and inner nozzle body 58. In such examples, air outlet passages 50A defined between inner nozzle body 58 and intermediate nozzle body 60 are supplied with air via cross-over passages 64 extending from an exterior surface to an interior surface of air nozzle body 62 and extending through intermediate nozzle body 60. Cross-over passages 64 are interposed between one or more first fuel passages 46B and/or one or more second fuel outlet passages 48.

Air nozzle body 62 includes a cylindrical or annular portion that surrounds intermediate nozzle body 60 to form one or more second fuel outlet passages 48 and/or one or more air outlet passages 50. At a discharge end of fuel injector 14, air nozzle body 62 includes a third discharge portion formed by another wall section that converges toward axis A. In some examples, an annular gap defined between air nozzle body 62 and intermediate nozzle body 60 forms second fuel outlet passage 48. In other examples, a circumferentially spaced array of second fuel outlet passages 48 extends through air nozzle body 62. Air nozzle body 62 further includes outer wall section that extends outward relative to axis A. Outer wall section includes a circumferential array of apertures extending therethrough to form air outlet passages 50B. Centerlines of air outlet passages 50B converge towards the toward axis A to direct air to mix with fuel discharged from nozzle 30.

In operation, fuel received through a first fuel tube 34A (i.e., primary fuel) enters one or more first outlet passages 44A to discharge centrally from nozzle 30. Fuel received through a second fuel tube 34B (i.e., secondary fuel) enters one or more additional first outlet passages 44B to discharge from nozzle 30 into an inner annular region surrounding a central discharge region associated with primary fuel. A second fuel enters nozzle 30 via fuel cavity 56 and discharges from nozzle 30 through second outlet passages 48 into an outer annular region surrounding the inner annular region. Air enters apertures 56 and cross-over passages 64 of air nozzle body 62, discharging from nozzle 30 into the central region the inner annular region, and the outer annular region to mix with primary fuel and/or secondary fuel from a first source and/or to mix with fuel from a second source.

Figure 4:
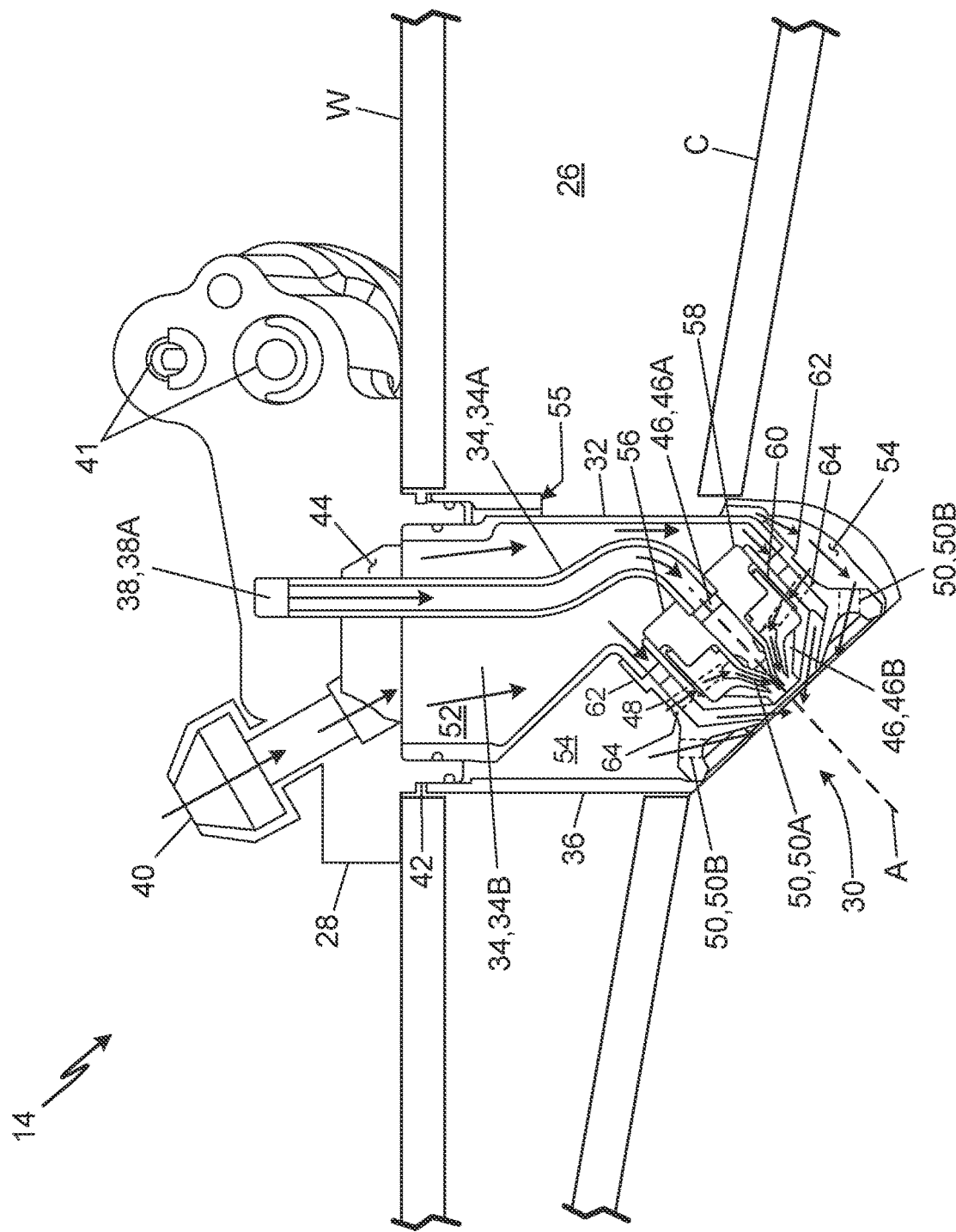
FIG. 4 is a cross-sectional view of another example fuel injector capable of receiving fuel from multiple fuel sources.
Figure 5:
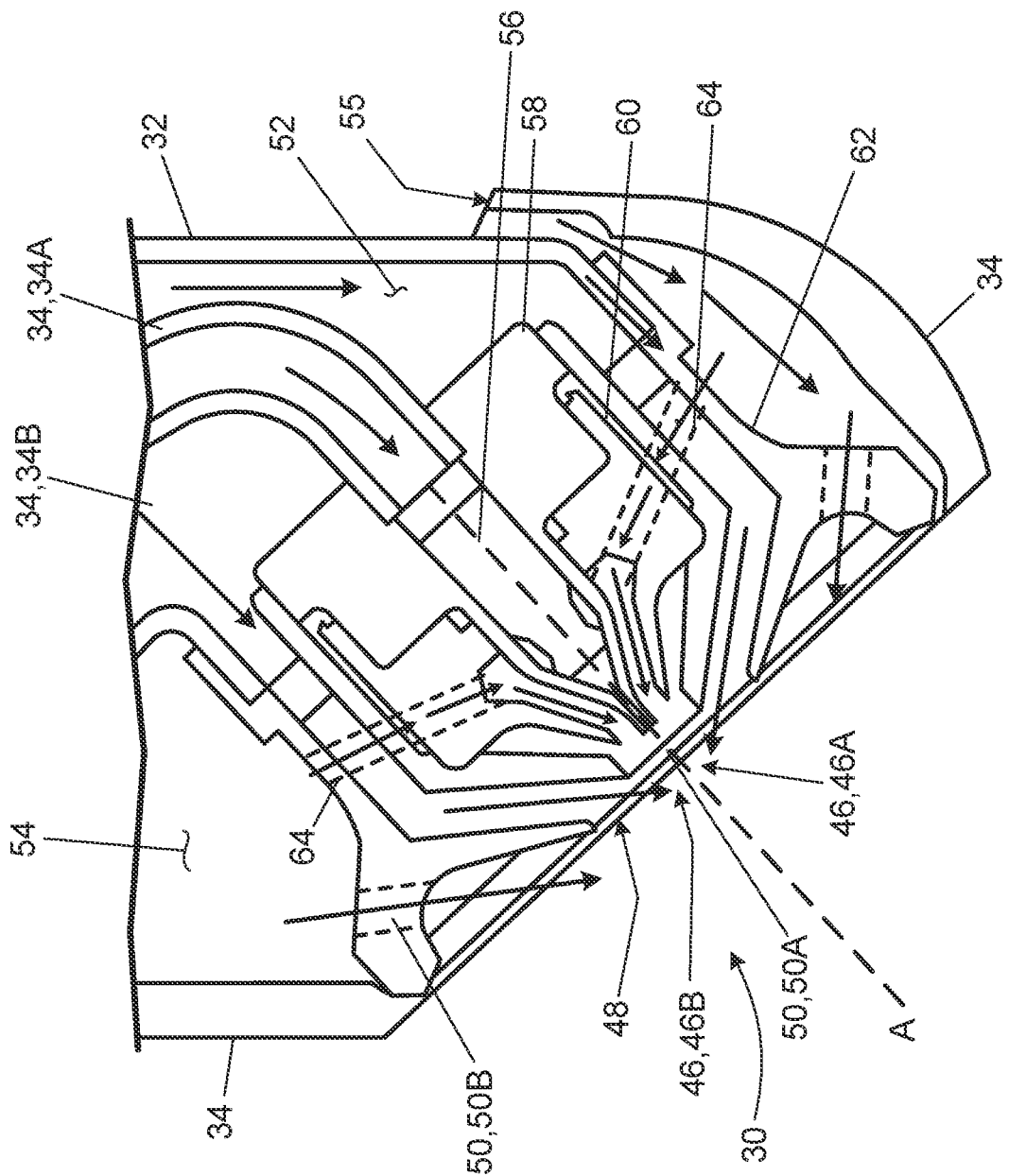
FIG. 5 is an enlarged cross-sectional view of the example fuel injector of FIG. 4.

FIG. 4 and FIG. 5 depict another example of fuel injector 14 for dispensing fuel from multiple fuel sources and providing target air-fuel ratios with a common air supply. FIG. 4 is a cross-sectional view of fuel injector 14. FIG. 5 is an enlarged view of the distal end of the injector 14 depicted by FIG. 4. FIG. 4 and FIG. 5 are discussed together.

As depicted by FIG. 4 and FIG. 5, fuel injector 14 includes head body 28, nozzle 30, fuel body 32, fuel tube 34A, and in some examples, outer body 36. Fuel body 32 and outer body 36 are identical to components described in reference to FIG. 2 and FIG. 3. However, in lieu of multiple fuel tubes 34, fuel injector 14 includes a single fuel tube 34A the extends from and connects first fuel outlet passage 38A to first fuel outlet passage 46A of nozzle 30. Accordingly, head body 28 does not include additional first fuel inlet passages (e.g., first fuel passage 38B), and nozzle body 30 does not include additional first fuel outlet passages (e.g., first fuel outlet passage 46B) connected to additional fuel tubes (e.g., fuel tube 34B).

As depicted by FIG. 4 and FIG. 5, fuel injector 14 defines a first fuel path that includes, in series, first fuel inlet passage 38A, fuel tube 34A, and first fuel outlet passage 40A. A second fuel path of fuel injector 14 can include, in series, second fuel inlet passage 40, second fuel cavity 52, and second fuel outlet passage 40. Air received by air inlet passage 55 flows, in series, through air cavity 54 and air outlet passages 50 before discharging from nozzle 30 and mixing with fuel from one or more sources of fuel.

Figure 6:
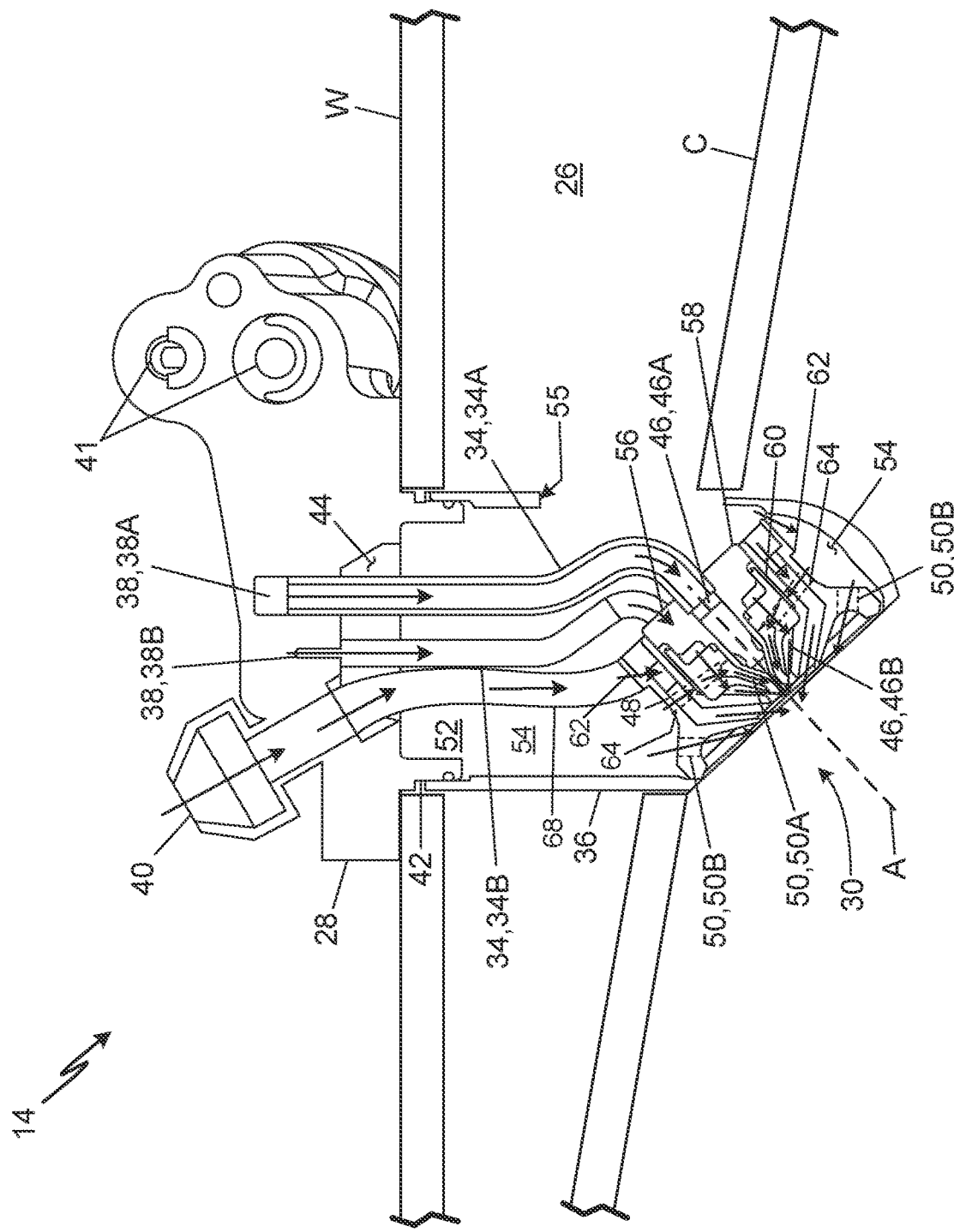
FIG. 6 is a cross-sectional view of another example fuel injector capable of receiving fuel from multiple fuel sources.

FIG. 6 depicts a cross-sectional view of another example fuel injector 32. As depicted, fuel injector 14 includes head body 28, nozzle 30, one or more fuel tubes 34 (e.g., fuel tube 34A and 34B), and in some examples, outer body 36 that are identical to like components described in reference to FIG. 2 and FIG. 3, except as described below. In lieu of fuel body 32, fuel injector 14 includes fuel tube 68 that extends between and fluidly connects second fuel inlet passage 40 of head body 28 to second fuel outlet passage 48 of nozzle 30.

As depicted by FIG. 6, fuel injector 14 defines a first fuel path that includes, in series, first fuel inlet passage 38A, fuel tubes 34A and 34B, and first fuel outlet passages 46A and 46B. A second fuel path of fuel injector 14 can include, in series, a second fuel inlet passage 40, second fuel tube 68, and second fuel outlet passage 48. Air received by air inlet passage 55 flows, in series, through air cavity 54 and air outlet passages 50 before discharging from nozzle 30 and mixing with fuel from one or more sources of fuel.

Figure 7A:
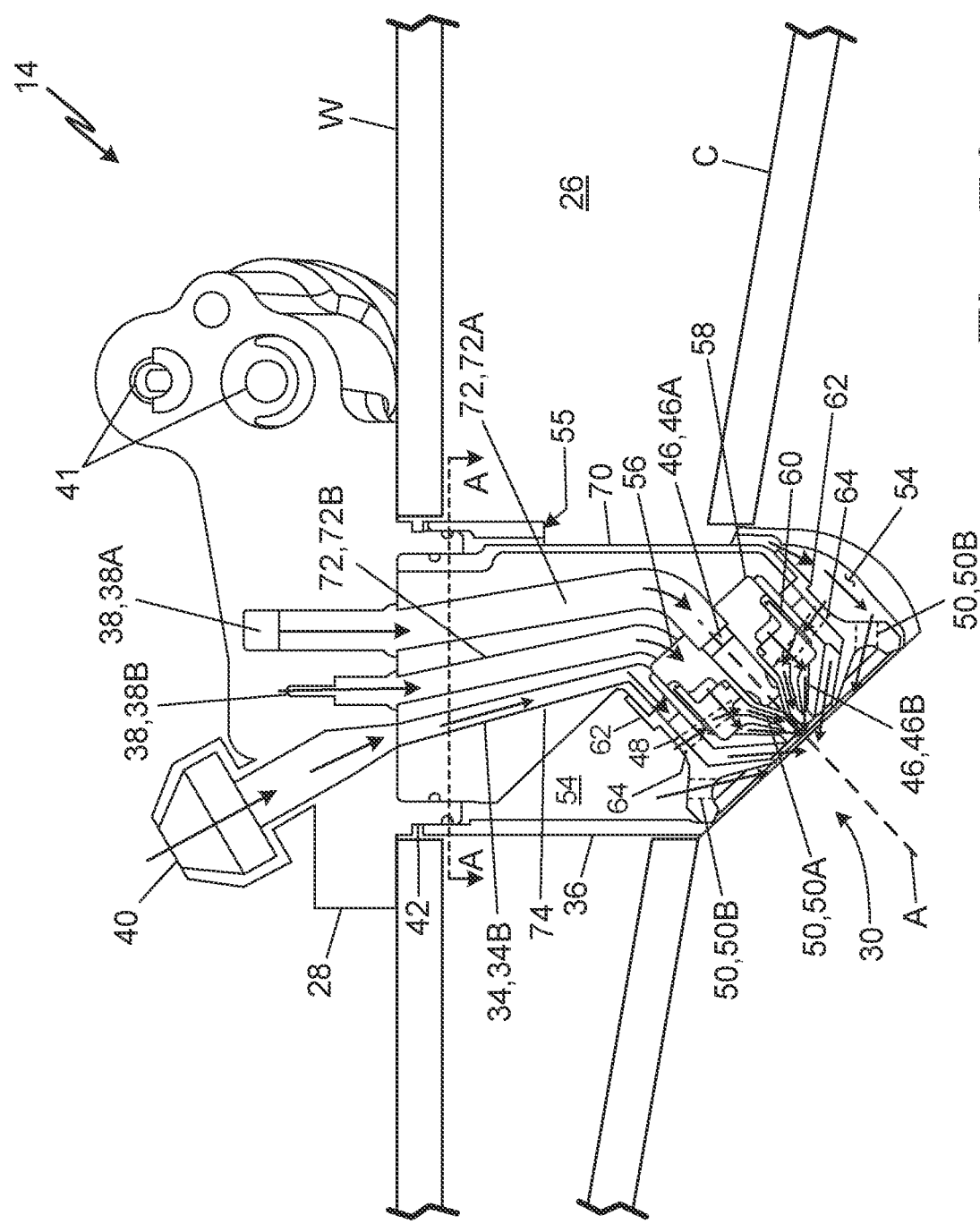
FIG. 7A, FIG. 7B, and FIG. 7C are cross-sectional views of another example fuel injector capable of receiving fuel from multiple fuel sources.

FIG. 7A depicts a cross-sectional view of another example fuel injector 32. As depicted, fuel injector 14 includes head body 28, nozzle 30, and in some examples, outer body 36 that are identical to like components described in reference to FIG. 2 and FIG. 3, except as described below. In lieu of fuel body 32, fuel injector 14 includes stem 70 that extends between to join head body 28 to nozzle 30. Stem 70 is a monolithic body that includes one or more internal fuel passages 72 (e.g., internal fuel passage 72A and internal fuel passage 72B) and at least one secondary internal fuel passage 74, each extending through stem 70. As depicted, internal fuel passage 72A extends between and fluidly connects first fuel inlet passage 38A to first fuel outlet passage 46A. Internal fuel passage 72B extends between and fluidly connects first fuel inlet passage 38B to first fuel outlet passage 46B. Secondary internal fuel passage 74 extends between and fluidly connects second fuel inlet passage 40 to second fuel outlet passage 48. As depicted by FIG. 6, fuel injector 14 defines a first fuel path that includes, in series, first fuel inlet passages 38A and 38B, internal fuel passages 72A and 72B, and first fuel outlet passages 46A and 46B. A second fuel path of fuel injector 14 can include, in series, second fuel inlet passage 40, second internal fuel passage 74, and second fuel outlet passage 48. Air received by air inlet passage 55 flows, in series, through air cavity 54 and air outlet passages 50 before discharging from nozzle 30 and mixing with fuel from one or more sources of fuel.

Figure 7C:
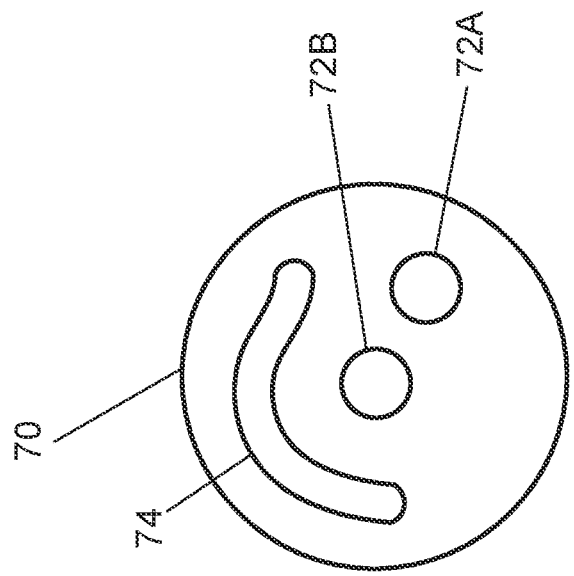
Figure 7B:
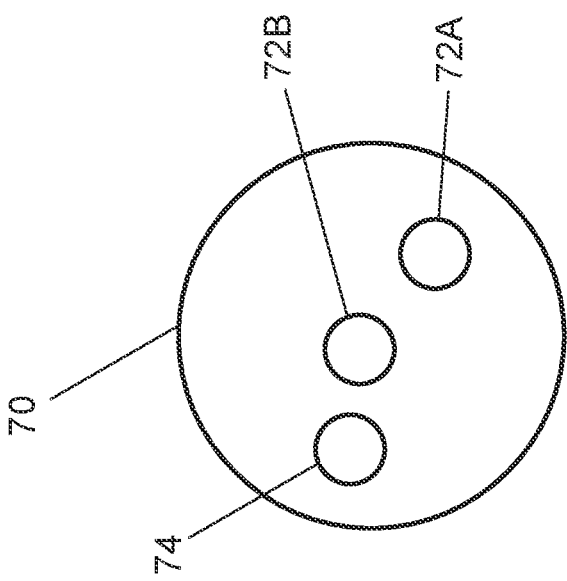

FIG. 7B is a cross-sectional view taken along line A-A in FIG. 7A depicting stem 70, internal fuel passage 72A, internal fuel passage 72B, and secondary internal fuel passage 74. Passages 72A, 72B, and 74 are depicted as single passages with a circular cross-section. FIG. 7C is an alternate cross-sectional view taken along line A-A in FIG. 7A depicting an alternate configuration of stem 70, internal fuel passage 72A, internal fuel passage 72B, and secondary internal fuel passage 74. As depicted in FIG. 7C, secondary internal fuel passage 74 has an oblong cross-section rather than a circular cross-section. In other examples, injector 14 can include multiple internal fuel passages 72A, multiple internal fuel passages 72B, and/or multiple secondary fuel passages 74. In each example, secondary fuel passage 74 are positioned closer to an outer periphery of stem 70, such as depicted in FIGS. 7B and 7C.

FIG. 8 depicts another example fuel injector 14 equipped outer body 136, an alternative to outer body 36. Outer body 136 can be paired with any of the foregoing examples of fuel injector 14. However, instead of defining air cavity 54 which communicates with air outlet passages 50B and cross-over passages 64 of air nozzle body 62, outer body 136 conforms to fuel body 32 and terminates prior to the injector discharge end to form air cavity 154.

Outer body 136 extends from head body 28 and, like outer body 36, may be joined to head body 28 at the exterior surface of rim 42. As depicted, outer body 136 includes a cylindrical section conforming and circumscribing rim 42 and the cylindrical section of fuel body 32. Connected to the cylindrical section, outer body 136 includes a tapered section conforming to and circumscribing the tapered section of fuel body 32. In certain examples, outer body 136 can include a second cylindrical section extending from the tapered section of the outer body 136 to conform to an outer periphery of nozzle 30, a terminal end of which does not overlap air outlet passages 50B and, when present, crossover passages 64. Each section of outer body 136 defines a gap with an adjacent component of fuel injector 14 to form air cavity 154. As depicted, outer body 136 permits air outlet passages 50B and cross-over passages 64, where present, to communicate directly with air source 26 rather than via one or more air inlet passages 56 and air cavity 54. While outer body 136 and air cavity 154 do not form part of the air flow path in this example, outer body 136 and air cavity 154 continue to form a thermal barrier between air source 26 and fuel body 32.

DISCUSSION OF POSSIBLE EMBODIMENTS

The following are non-exclusive descriptions of possible embodiments of the present invention.

A Multi-Fuel Injector

A fuel injector according to an example embodiment of this disclosure includes, among other possible things, a first fuel path, a second fuel path, and an air path. The second fuel path is independent from the first fuel path.

The fuel injector of the preceding paragraph can optionally include, additionally and/or alternatively, any one or more of the following features, configurations and/or additional components.

A further embodiment of the foregoing fuel injector, wherein a ratio of a first outlet area of the first fuel path, a second outlet area of the second fuel path, and a third outlet area of the air path can be constant.

A further embodiment of the foregoing fuel injector can include a head body comprising a first fuel inlet passage and a second fuel inlet passage.

A further embodiment of any of the foregoing fuel injectors can include a nozzle comprising a first fuel outlet passage, a second fuel outlet passage, and an air outlet passage.

A further embodiment of any of the foregoing fuel injectors can include a fuel body mated to the head body and extending from the head body to the nozzle body.

A further embodiment of any of the foregoing fuel injectors, wherein the fuel body can bound a fuel cavity that fluidly connects the second inlet passage to the second outlet passage.

A further embodiment of any of the foregoing fuel injectors can include a first fuel tube mated to the head body and extending through the fuel cavity to the nozzle body.

A further embodiment of any of the foregoing fuel injectors, wherein the first fuel tube can fluidly connect the first inlet passage to the first outlet passage.

A further embodiment of any of the foregoing fuel injectors, wherein the first fuel path can include, in series, the first fuel inlet passage, the first fuel tube, and the first fuel outlet passage.

A further embodiment of any of the foregoing fuel injectors, wherein the second fuel path can include, in series, the second fuel inlet passage, the fuel cavity, and the second fuel outlet passage.

A further embodiment of any of the foregoing fuel injectors, wherein the air path can include the air outlet passage.

A further embodiment of any of the foregoing fuel injectors can include an outer body mated to the head body and concentric with the fuel body at the head body.

A further embodiment of any of the foregoing fuel injectors, wherein the outer body can include an air inlet passage extending through the outer body.

A further embodiment of any of the foregoing fuel injectors can include an air cavity bound by the outer body, the fuel body, and the nozzle that fluidly connects the air inlet passage to the air outlet passage.

A further embodiment of any of the foregoing fuel injectors, wherein the air path can include, in series, the air inlet passage, the air cavity, and the air outlet passage.

A further embodiment of any of the foregoing fuel injectors, wherein a rim can protrude from the head body.

A further embodiment of any of the foregoing fuel injectors, wherein an inner periphery of the rim can engage the fuel body.

A further embodiment of any of the foregoing fuel injectors, wherein an outer periphery of the rim can engage the outer body.

A further embodiment of any of the foregoing fuel injectors, wherein the head body can include a fuel pocket intersecting the second inlet passage that is open to the fuel cavity.

A further embodiment of any of the foregoing fuel injectors, wherein the nozzle can include a center body.

A further embodiment of any of the foregoing fuel injectors, wherein the nozzle can include a first nozzle body surrounding the center body and forming the first fuel outlet passage.

A further embodiment of any of the foregoing fuel injectors, wherein the nozzle can include an air nozzle body surrounding the first nozzle body and forming the air outlet passage, wherein the outer body engages the air nozzle body.

A further embodiment of any of the foregoing fuel injectors can include a second fuel tube mated to the head body and extending through the fuel cavity to the nozzle body.

A further embodiment of any of the foregoing fuel injectors, wherein the head body can include a third fuel inlet passage.

A further embodiment of any of the foregoing fuel injectors, wherein the nozzle can include a third fuel outlet passage.

A further embodiment of any of the foregoing fuel injectors, wherein the second fuel tube can fluidly connect the third fuel inlet passage to the third fuel outlet passage.

A further embodiment of any of the foregoing fuel injectors, wherein the nozzle can include a third nozzle body surrounding the first nozzle body and forming the third nozzle fuel outlet passage.

A further embodiment of any of the foregoing fuel injectors, wherein the nozzle can include an air nozzle body surrounding the third nozzle body and forming the air outlet passage, wherein the outer body engages the air nozzle body.

A further embodiment of any of the foregoing fuel injectors, wherein the fuel body can include a tapered portion that has a monotonically decreasing cross section such that an outlet area of the fuel body is less than an inlet area of the fuel body at the head body.

A further embodiment of any of the foregoing fuel injectors can include an outer body mated to the head body and concentric with the fuel body at the head body.

A further embodiment of any of the foregoing fuel injectors, wherein the outer body can be spaced from and conforms to the fuel body.

A further embodiment of any of the foregoing fuel injectors can include an air cavity bound by the outer body and the fuel body.

A further embodiment of any of the foregoing fuel injectors can include a stem.

A further embodiment of any of the foregoing fuel injectors, wherein the stem includes a first internal fuel passage fluidly connecting one of the first fuel inlet passages to one of the first fuel outlet passages.

A further embodiment of any of the foregoing fuel injectors, wherein the stem includes multiple first internal fuel passages, each of the first internal fuel passages fluidly connecting one of the first fuel inlet passages to one of the first fuel outlet passages.

A further embodiment of any of the foregoing fuel injectors, wherein the stem can include a second internal fuel passage fluidly connecting the second fuel inlet passage to the second fuel outlet passage.

A Multi-Source Fuel System with Multi-Fuel Injectors

A fuel system in accordance with an example embodiment of this disclosure includes, among other possible things, a first fuel source, a second fuel source, an air source, and a fuel injector. The fuel injector includes a first fuel path, a second fuel path, and an air path. The second fuel path is independent from the first fuel path. The first fuel source is fluidly connected to the first fuel path. The second fuel source is fluidly connected to the second fuel path. The air source is fluidly connected to the air path.

The fuel system of the preceding paragraph can optionally include, additionally and/or alternatively, any one or more of the following features, configurations and/or additional components.

A further embodiment of the foregoing fuel system, wherein a ratio of a first outlet area of the first fuel path, a second outlet of the second fuel path, and a third outlet area of the air path can be constant.

A further embodiment of any of the foregoing fuel systems, wherein the first fuel source can contain a liquid fuel and the second fuel source contains a gaseous fuel.

A further embodiment of any of the foregoing fuel systems, wherein the first fuel source can be aviation fuel.

A further embodiment of any of the foregoing fuel systems, wherein the second fuel source can be hydrogen gas.

A further embodiment of any of the foregoing fuel systems, wherein the fuel injector can include a head body comprising a first fuel inlet passage and a second fuel inlet passage.

A further embodiment of any of the foregoing fuel systems, wherein the fuel injector can include a nozzle comprising a first fuel outlet passage, a second fuel outlet passage, and an air outlet passage.

A further embodiment of any of the foregoing fuel systems, wherein the fuel injector can include a fuel body mated to the head body and extending from the head body to the nozzle body.

A further embodiment of any of the foregoing fuel systems, wherein the fuel body of the fuel injector can bound a fuel cavity that fluidly connects the second inlet passage to the second outlet passage.

A further embodiment of any of the foregoing fuel systems, wherein the fuel injector can include a first fuel tube mated to the head body and extending through the fuel cavity to the nozzle body.

A further embodiment of any of the foregoing fuel systems, wherein the first fuel tube of the fuel injector can fluidly connect the first inlet passage to the first outlet passage.

A further embodiment of any of the foregoing fuel systems, wherein the first fuel path can include, in series, the first fuel inlet passage, the first fuel tube, and the first fuel outlet passage.

A further embodiment of any of the foregoing fuel systems, wherein the second fuel path can include, in series, the second fuel inlet passage, the fuel cavity, and the second fuel outlet passage.

A further embodiment of any of the foregoing fuel systems, wherein the air path can include the air outlet passage.

A further embodiment of any of the foregoing fuel systems, wherein the fuel injector can include an outer body mated to the head body and concentric with the fuel body at the head body.

A further embodiment of any of the foregoing fuel systems, wherein the outer body can include an air inlet passage extending through the outer body.

A further embodiment of any of the foregoing fuel systems, wherein the fuel injector can include an air cavity bound by the outer body, the fuel body, and the nozzle that fluidly connects the air inlet passage to the air outlet passage.

A further embodiment of any of the foregoing fuel systems, wherein the air path can include, in series, the air inlet passage, the air cavity, and the air outlet passage.

A further embodiment of any of the foregoing fuel systems, wherein a rim can protrude from the head body of the fuel injector.

A further embodiment of any of the foregoing fuel systems, wherein an inner periphery of the rim can engage the fuel body.

A further embodiment of any of the foregoing fuel systems, wherein an outer periphery of the rim can engage the outer body.

A further embodiment of any of the foregoing fuel systems, wherein the head body can include a fuel pocket intersecting the second inlet passage that is open to the fuel cavity.

A further embodiment of any of the foregoing fuel systems, wherein the nozzle can include a center body.

A further embodiment of any of the foregoing fuel systems, wherein the nozzle can include a first nozzle body surrounding the center body and forming the first fuel outlet passage.

A further embodiment of any of the foregoing fuel systems, wherein the nozzle can include an air nozzle body surrounding the first nozzle body and forming the air outlet passage, wherein the outer body engages the air nozzle body.

A further embodiment of any of the foregoing fuel systems, wherein fuel injector can include a second fuel tube mated to the head body and extending through the fuel cavity to the nozzle.

A further embodiment of any of the foregoing fuel systems, wherein the head body can include a third fuel inlet passage.

A further embodiment of any of the foregoing fuel systems, wherein the nozzle can include a third fuel outlet passage.

A further embodiment of any of the foregoing fuel systems, wherein the second fuel tube can fluidly connect the third fuel inlet passage to the third fuel outlet passage.

A further embodiment of any of the foregoing fuel systems, wherein the nozzle can include a third nozzle body surrounding the first nozzle body and forming the third nozzle fuel outlet passage.

A further embodiment of any of the foregoing fuel systems, wherein fuel injector can include a third fuel tube mated to the head body and extending to the nozzle.

A further embodiment of any of the foregoing fuel systems, wherein the third fuel tube can fluidly connect the third fuel inlet passage to the third fuel outlet passage.

A further embodiment of any of the foregoing fuel systems, wherein the nozzle can include an air nozzle body surrounding the third nozzle body and forming the air outlet passage, wherein the outer body engages the air nozzle body.

A further embodiment of any of the foregoing fuel systems, wherein the fuel body can include a tapered portion that has a monotonically decreasing cross section such that an outlet area of the fuel body is less than an inlet area of the fuel body at the head body.

A further embodiment of any of the foregoing fuel systems, wherein the fuel injector can include an outer body mated to the head body and concentric with the fuel body at the head body.

A further embodiment of any of the foregoing fuel systems, wherein the outer body can be spaced from and conforms to the fuel body.

A further embodiment of any of the foregoing fuel systems, wherein the fuel injector can include an air cavity bound by the outer body and the fuel body.

A further embodiment of any of the foregoing fuel systems, wherein the fuel injector can include a stem.

A further embodiment of any of the foregoing fuel systems, wherein the stem includes a first internal fuel passage fluidly connecting one of the first fuel inlet passages to one of the first fuel outlet passages.

A further embodiment of any of the foregoing fuel systems, wherein the stem includes multiple first internal fuel passages, each of the first internal fuel passages fluidly connecting one of the first fuel inlet passages to one of the first fuel outlet passages.

A further embodiment of any of the foregoing fuel systems, wherein the stem can include a second internal fuel passage fluidly connecting the second fuel inlet passage to the second fuel outlet passage.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A fuel injector comprising:
   a head body comprising a first fuel inlet passage and a second fuel inlet passage;
   a nozzle comprising a first fuel outlet passage, a second fuel outlet passage, and an air outlet passage;
   a fuel body mated to the head body and extending from the head body to the nozzle body, wherein the fuel body bounds a fuel cavity that fluidly connects the second inlet passage to the second outlet passage; and
   a first fuel tube mated to the head body and extending through the fuel cavity to the nozzle body, wherein the first fuel tube fluidly connects the first inlet passage to the first outlet passage;
   an outer body mated to the head body and concentric with the fuel body at the head body, the outer body including an air inlet passage extending through the outer body;
   an air cavity bound by the outer body, the fuel body, and the nozzle that fluidly connects the air inlet passage to the air outlet passage;
   a first fuel path that includes, in series, the first fuel inlet passage, the first fuel tube, and the first fuel outlet passage;
   a second fuel path that is independent from the first fuel path and includes, in series, the second fuel inlet passage, the fuel cavity, and the second fuel outlet passage; and
   an air path includes, in series, the air inlet passage, the air cavity, and the air outlet passage.

2. A fuel injector for a gas turbine engine, the fuel injector comprising:
   a head body comprising a first fuel inlet passage and a second fuel inlet passage;
   a nozzle comprising a first fuel outlet passage, a second fuel outlet passage, and an air outlet passage;
   a fuel body joined to the head body and extending from the head body to the nozzle body, wherein the fuel body bounds a fuel cavity that fluidly connects the second inlet passage to the second outlet passage; and
   a first fuel tube joined to the head body and extending through the fuel cavity to the nozzle body, wherein the first fuel tube fluidly connects the first inlet passage to the first outlet passage;
   an outer body mated to the head body and concentric with the fuel body at the head body, the outer body including an air inlet passage extending through the outer body; and
   an air cavity bound by the outer body, the fuel body, and the nozzle that fluidly connects the air inlet passage to the air outlet passage.

3. The fuel injector of claim 2, wherein a rim protrudes from the head body, and wherein an inner periphery of the rim engages the fuel body, and wherein an outer periphery of the rim engages the outer body.

4. The fuel injector of claim 2, wherein the head body includes a fuel pocket intersecting the second inlet passage and open to the fuel cavity.

5. The fuel injector of claim 2, wherein the nozzle comprises:
   a center body; and
   a first nozzle body surrounding the center body and forming the first fuel outlet passage.

6. The fuel injector of claim 5, wherein the nozzle further comprises:
   an air nozzle body surrounding the first nozzle body and forming the air outlet passage, wherein the outer body engages the air nozzle body.

7. The fuel injector of claim 2, further comprising:
   a second fuel tube mated to the head body and extending through the fuel cavity to the nozzle body;
   wherein the head body includes a third fuel inlet passage;
   wherein the nozzle includes a third fuel outlet passage; and
   wherein the second fuel tube fluidly connects the third fuel inlet passage to the third fuel outlet passage.

8. The fuel injector of claim 7, wherein the nozzle comprises:
   a center body;
   a first nozzle body surrounding the center body and forming the first fuel outlet passage; and
   a third nozzle body surrounding the first nozzle body and forming the third nozzle fuel outlet passage.

9. The fuel injector of claim 8, wherein the nozzle further comprises:
   an air nozzle body surrounding the third nozzle body and forming the air outlet passage, wherein the outer body engages the air nozzle body.

10. The fuel injector of claim 2, wherein the fuel body includes a tapered portion that has a monotonically decreasing cross section such that an outlet area of the fuel body is less than an inlet area of the fuel body at the head body.

11. The fuel injector of claim 2, further comprising:
    an outer body mated to the head body and concentric with the fuel body at the head body, wherein the outer body is spaced from and conforms to the fuel body; and
    an air cavity bound by the outer body and the fuel body.

12. A fuel system comprising:
    a first fuel source;
    a second fuel source; and
    a fuel injector, the fuel injector comprising:
        a head body comprising a first fuel inlet passage and a second fuel inlet passage;
        a nozzle comprising a first fuel outlet passage, a second fuel outlet passage, and an air outlet passage;
        a fuel body mated to the head body and extending from the head body to the nozzle body, wherein the fuel body bounds a fuel cavity that fluidly connects the second inlet passage to the second outlet passage;
        a first fuel tube mated to the head body and extending through the fuel cavity to the nozzle body, wherein the first fuel tube fluidly connects the first inlet passage to the first outlet passage;
        an outer body mated to the head body and concentric with the fuel body at the head body, the outer body including an air inlet passage extending through the outer body; and
        an air cavity bound by the outer body, the fuel body, and the nozzle that fluidly connects the air inlet passage to the air outlet passage;
        wherein the first fuel inlet passage, the first tube, and the first fuel outlet passage fluidly connect to the first fuel source; and
        wherein the second fuel inlet passage, the fuel cavity, and the second fuel outlet fluidly connect with the second fuel source independently of the first fuel source.

13. The fuel system of claim 12, wherein the first fuel source contains a liquid fuel and the second fuel source contains a gaseous fuel.

14. The fuel system of claim 13, wherein the second fuel source is hydrogen gas.

15. The fuel system of claim 12, wherein the fuel body includes a tapered portion that has a monotonically decreasing cross section such that an outlet area of the fuel body is less than an inlet area of the fuel body at the head body.

16. The fuel system of claim 12, further comprising:
a second fuel tube mated to the head body and extending through the fuel cavity to the nozzle body;
wherein the head body includes a third fuel inlet passage;
wherein the nozzle includes a third fuel outlet passage; and
wherein the second fuel tube fluidly connects the third fuel inlet passage to the third fuel outlet passage.

* * * * *